(12) United States Patent
Kim et al.

(10) Patent No.: US 9,957,197 B1
(45) Date of Patent: May 1, 2018

(54) POROUS GEOPOLYMERS

(71) Applicant: Keanetech, LLC, Champaign, IL (US)

(72) Inventors: Dong Kyu Kim, Irvine, CA (US);
Waltraud M. Kriven, Champaign, IL (US)

(73) Assignee: Keanetech, LLC, Champaign, IL (US)

( * ) Notice: Subject to any disclaimer, the term of this patent is extended or adjusted under 35 U.S.C. 154(b) by 0 days. days.

(21) Appl. No.: 15/456,669

(22) Filed: Mar. 13, 2017

(51) Int. Cl.
*C01B 33/26* (2006.01)
*C04B 28/00* (2006.01)

(52) U.S. Cl.
CPC .................... *C04B 28/006* (2013.01)

(58) Field of Classification Search
CPC .................................... C04B 28/006
USPC ...................................... 423/328.1
See application file for complete search history.

(56) References Cited

U.S. PATENT DOCUMENTS

| 4,432,798 A | 2/1984 | Helferich et al. |
| 4,608,795 A | 9/1986 | Neuschaeffer et al. |
| 5,244,726 A | 9/1993 | Laney et al. |
| 2012/0260594 A1* | 10/2012 | Blackstock ........... C04B 28/006 52/302.1 |

OTHER PUBLICATIONS

A. Buchwald et al., "Stabilised Foam Clay Material with High Performance Thermal Insulation Properties," Ceramic Forum Internationale, vol. 81, No. 8, pp. 30-42, Aug. 1, 2004.

T. Metroke et al., "Effect of Curing Conditions on the Porosity Characteristics of Metakaolin-Fly Ash Geopolymers," presented at the 34th International Conference on Advanced Ceramics & Composites, Jan. 4, 2010.

* cited by examiner

*Primary Examiner* — Haytham Soliman
(74) *Attorney, Agent, or Firm* — Philip L. Bateman

(57) ABSTRACT

Porous aluminosilicate geopolymers having a desired molar ratio of silicon dioxide to aluminum oxide are prepared by mixing an aluminosilicate powder in an alkaline silicate solution, placing into a sealed container, and then curing. The desired density and compressive strength of the geopolymer are achieved by varying the excess of alkaline silicate and by varying the curing temperature. The desired pore size distribution of the geopolymer is achieved by varying the curing conditions.

5 Claims, No Drawings

POROUS GEOPOLYMERS

FIELD OF THE INVENTION

This invention relates to setting construction materials.

BACKGROUND OF THE INVENTION

1. Concrete

Concrete is a construction material that is the most widely used man-made material in the world. Concrete is a fluid material when first made and hardens over time. There are many reasons for the popularity of concrete. It is relatively inexpensive, capable of taking on the shape of a mold, exceptionally high in compression strength, and very durable. However, concrete is not without its drawbacks. One drawback of concrete is that it is relatively low in tensile strength. In other words, it has little ability to bend, has little impact resistance, and is brittle. A second drawback is that its durability is significantly reduced when exposed to repeated freeze-thaw cycles in the presence of water. Concrete is relatively porous and water is able to permeate the material. Freezing and thawing, with the accompanying expansion and contraction of the water, can form cracks in the concrete.

2. Cement

Concrete is composed of cement, aggregate (sand, gravel, crushed stone, etc.), and water. Cement is a fine gray powder consisting of calcium oxide CaO (commonly known as lime), silicon dioxide $SiO_2$ (commonly known as silica), aluminum oxide $Al_2O_3$ (commonly known as alumina), iron oxide, and other materials. Cement reacts with the water to form chemical bonds that hold the materials together in concrete. Cement is commonly made by heating limestone (which primarily contains calcium carbonate $CaCO_3$) and then grinding. Naturally occurring limestone sometimes contains the desired amounts of silicon dioxide, aluminum oxide, and iron oxide. If not, clays and/or other materials are added to obtain the desired composition.

A wide variety of materials are sometimes added to cement to improve the properties of the concrete made with the cement. Such materials include fly ash, slag, silica fume, metakaolin, and cellulose derivatives. Fly ash is a byproduct of burning coal that contains aluminum oxide, silicon dioxide, calcium oxide, carbon, and small amounts of other materials. Slag is a byproduct of smelting metal ores that contains metal oxides and silicon dioxide. Silica fume is a byproduct of silicon production consisting of fine silicon dioxide. Metakaolin is an aluminosilicate having the nominal formula $Al_2Si_2O_7$ that is made from clay.

3. Geopolymers

Geopolymers are synthetic aluminosilicate materials that are formed by reacting an aluminosilicate powder with an alkaline silicate solution and then curing at an elevated temperature. The preparation and use of geopolymers are disclosed in many references, including Helferich et al., U.S. Pat. No. 4,432,798, Feb. 21, 1984; Neuschaeffer et al., U.S. Pat. No. 4,608,795, Sep. 2, 1986; and Laney et al., U.S. Pat. No. 5,244,726, Sep. 14, 1993.

Geopolymers are sometimes added to cement (and to other materials such as composites and ceramics) to improve their properties. Geopolymers are also used by themselves for a wide variety of applications. For example, the use of geopolymers for thermal insulation is disclosed in A. Buchwald et al., "Stabilised Foam Clay Material with High Performance Thermal Insulation Properties," Ceramic Forum Internationale, Vol. 81, No. 8, pp. 30-42 (August 2004).

The density, compressive strength, and pore size distribution of porous geopolymers are generally dependent upon the raw materials. The properties are also dependent upon curing conditions. For example, the effect of curing conditions on porosity is disclosed in T. Metroke et al., "Effect of Curing Conditions on the Porosity Characteristics of Metakaolin-Fly Ash Geopolymers," presented at the 34th International Conference on Advanced Ceramics & Composites (Jan. 4, 2010). However, there has been no process disclosed that enables a desired density, compressive strength, and pore size distribution to be achieved.

Accordingly, there is a demand for an improved process for preparing porous geopolymers that enables the desired density, compressive strength, and pore size distribution to be achieved.

SUMMARY OF THE INVENTION

The general object of this invention is to provide an improved process for preparing porous geopolymers. A more particular object is to provide a process for preparing porous geopolymers having the desired density, compressive strength, and pore size distribution.

We have invented a process for preparing a porous aluminosilicate geopolymer having a desired molar ratio of silicon dioxide to aluminum oxide, a density of about 0.5 to 1.2 $g/cm^3$, and a compressive strength of about 1 to 6 MPa. The process comprises: (a) adding an aluminosilicate powder to an alkaline silicate solution, the alkaline silicate solution being present in an amount that is about 1.5 to 3.5 times the stoichiometric amount; (b) mixing to create a homogenous mixture; (c) placing the mixture into a sealed container; and (d) curing at a temperature of about 60 to 150° C.

The process of this invention enables porous geopolymers to be prepared having the desired density, compressive strength, and pore size distribution by varying process parameters.

DETAILED DESCRIPTION OF THE INVENTION

1. The Invention in General

The process of this invention prepares porous geopolymers of the desired density, compressive strength, and pore size distribution by reacting an aluminosilicate powder and an alkaline silicate solution under controlled conditions.

2. Aluminosilicate Powder

The aluminosilicate powder contains aluminum, silicon, and oxygen. Suitable aluminosilicate powders include slag, mixtures of slag and fly ash, and mixtures of fly ash and metakaolin. The preferred aluminosilicate powder comprises a mixture of fly ash and metakaolin. The weight ratio of fly ash to metakaolin is generally about 2:1 to 20:1, preferably about 5:1 to 10:1, and most preferably about 6:1 to 9:1. A suitable fly ash is BORAL Class F fly ash, a commercial product of Boral Material Technologies of San Antonio, Tex. A suitable metakaolin in METAMAX metakaolin, a commercial product of Engelhard Corporation of Iselin, N.J. Fly ash is much less expensive than metakaolin. Fly ash also contains various materials other than aluminosilicates. It is believed that these other materials are partially responsible for the improvement in the properties of the porous geopolymer.

3. Alkaline Silicate Solution

The alkaline silicate solution is generally prepared by reacting sodium hydroxide with silicon dioxide (silica). Calcium hydroxide and other alkaline compounds are suitable but are less desirable because of their cost.

4. Molar Ratio

The amount of alkaline silicate to aluminosilicate is generally about 1.5 to 3.5 times the stoichiometric amount. If the ratio is below about 1.5, the composition is so dense that it is difficult to mix into a homogenous mass. If the ratio is above about 3.5, the density and compressive strength of the resulting geopolymer are so low that they have limited utility. As a general rule within the operating range, increasing the amount of sodium silicate results in a decrease in density and a decrease in compressive strength in the resulting porous geopolymer. Porous geopolymers with relatively low densities (light weights) are useful in some applications where compressive strength is not critical.

5. Reaction Conditions

The reaction is conducted by adding the aluminosilicate to the alkaline silicate solution and then stirring in a high shear mixer until the mixture becomes a flowable fluid having about the same viscosity as honey (about 10,000 Centipoise). The mixture is then placed into a sealed container that prevents the escape of gas prior to curing.

6. Curing

The mixture is generally cured at a temperature of about 60 to 150° C. and are preferably cured at a temperature of about 90 to 130° C. As the mixture cures, chemical reactions occur that produce gases. The gases create pores in the hardening mixture. Other things being equal, increasing the curing temperature creates more pores which, in turn, decreases density and decreases compressive strength.

The curing is generally conducted as a single step. It is believed that a two-step curing at an initial temperature of about 60 to 90° C. for at least about two hours and then at a temperature of about 100 to 150° C. for at least about two hours decreases the size distribution of pores and may increase compressive strength for a given density.

7. Uses

The porous geopolymers prepared by the process of this invention are especially suited for use in cement. The amount used is a function of the properties desired in the cement and in concrete made with the cement. The porous geopolymers are also suited for uses as thermal insulation, as filtration media, and as components in fracking fluids.

8. Examples

The following examples are illustrative only.

Example 1

This example illustrates the preparation of a sodium silicate solution having the composition $Na_2O.2SiO_2.11H_2O$.

First, 831.0828 grams of deionized water was put into a stainless steel container. Next, the container was placed into a water bath and onto a mixing machine. Next, 333.4403 grams of solid sodium hydroxide (NaOH) (AR grade, Fischer Scientific, Pittsburgh, Pa.) was added very slowly. An exothermic reaction occurred. The water bath reduced water evaporation.

Next, 500 grams of fume silica (CAB-O-SIL silica, Cabot Corporation, Wheaton, Ill.) was added very slowly. An exothermic reaction occurred. The mixture was kept in a water bath with stirring in a mixer overnight to homogenize into a uniform sodium silicate solution.

Example 2

This example illustrates the preparation of four geopolymers having the formula $Na_2O.Al_2O_3.4SiO_2.12H_2O$ using varying amounts of sodium silicate solution.

Four compositions were prepared as shown in the following Table 2. Each composition contained three materials: (1) the sodium silicate solution from Example 1; (2) fly ash (BORAL Class F fly ash, Boral Material Technologies, San Antonio, Tex.); and (3) metakaolin (METAMAX metakaolin, Engelhard Corporation, Iselin, N.J.). Composition 1 contained the calculated stoichiometric amount of 27 weight percent sodium silicate solution. Composition 1 was very dense and could not be foamed as a porous geopolymer. Composition 2 contained 50 weight percent sodium silicate solution (1.85 times the stoichiometric amount). Composition 3 contained 65 weight percent sodium silicate solution (2.41 times the stoichiometric amount). Composition 4 contained 85 weight percent sodium silicate solution (3.15 times the stoichiometric amount).

The fly ash and metakaolin were added slowly to the sodium silicate solution in a high shear mixer. The mixing continued until the mixture was completely homogenized with a viscosity about that of honey.

TABLE 2

| Composition # | 1 | 2 | 3 | 4 |
|---|---|---|---|---|
| Sodium silicate Solution | 80.00 g (27 wt. %) | 200.00 g (50 wt. %) | 200.00 g (65 wt. %) | 200.00 g (85 wt. %) |
| Fly Ash | 192.59 g (65 wt. %) | 178.08 g (45 wt. %) | 96.30 g (31 wt. %) | 32.10 g (13 wt. %) |
| Metakaolin | 23.70 g (8 wt. %) | 21.92 g (5 wt. %) | 11.85 g (4 wt. %) | 3.95 g (2 wt. %) |

Example 3

This example illustrates the effects of curing temperature and amount of sodium silicate on the density and compressive strength of porous geopolymers.

Compositions 2, 3, and 4 from Example 2 were each divided into three equal amounts before curing for four hours. One of the three was cured at 90° C., one was cured at 110° C., and one was cured at 130° C. The cured compositions were allowed to cool to room temperature. The compositions were then tested for density and compressive strength using ASTM methods. The results are shown in the following table.

TABLE 3

| Curing Temperature (° C.) | Sodium Silicate (wt. %) | Density (g/cm$^3$) | Compressive Strength (MPa) |
|---|---|---|---|
| 90 | 50 | 1.1042 | 5.78 ± 1.12 |
| 90 | 65 | 0.9171 | 2.86 ± 0.29 |
| 90 | 85 | 0.7705 | 2.29 ± 0.31 |
| 110 | 50 | 1.0162 | 4.05 ± 0.59 |
| 110 | 65 | 0.9088 | 2.48 ± 0.24 |
| 110 | 80 | 0.5760 | 1.48 ± 0.25 |
| 130 | 50 | 0.8808 | 3.80 ± 0.58 |
| 130 | 65 | 0.8022 | 2.37 ± 0.37 |
| 130 | 85 | 0.5166 | 1.39 ± 0.16 |

The results show that increasing the amount of sodium silicate decreases density and decreases compressive strength. For example, when cured at 90° C., increasing the amount of sodium silicate from 50 weight percent (1.85 times the stoichiometric amount) to 85 weight percent (3.15 times the stoichiometric amount) resulted in a decrease in density from 1.1042 g/cm$^3$ to 0.7705 g/cm$^3$ and a decrease in compressive strength from 5.78 MPa to 2.29 MPa.

The results also show that increasing the curing temperature decreases density and decreases compressive strength. For example, when formulating with sodium silicate at 50 weight percent, increasing the curing temperature from 90° C. to 130° C. resulted in a decrease in density from 1.1042 g/cm$^3$ to 0.8808 g/cm$^3$ and a decrease in compressive strength from 5.78 MPa to 3.80 MPa.

We claim:

1. A process for preparing a porous aluminosilicate geopolymer having a density of about 0.5 to 1.2 g/cm$^3$ and a compressive strength of about 1 to 5 MPa, the process comprising:
   (a) adding an aluminosilicate powder to an alkaline silicate solution, the alkaline silicate solution being present in an amount that is about 1.5 to 3.5 times the stoichiometric amount of alkaline silicate to aluminosilicate;
   (b) mixing to create a homogenous mixture;
   (c) placing the mixture into a sealed container; and
   (d) curing at a temperature of about 90 to 130° C.

2. The process of claim 1 wherein the mixing is performed with a high shear mixer.

3. The process of claim 1 wherein the porous geopolymer is cured at a temperature of about 60 to 90° C. for at least two hours and then cured at a temperature of about 100 to 150° C. for at least two hours to minimize pore size distribution.

4. The process of claim 1 wherein the aluminosilicate powder comprises a mixture of fly ash and metakaolin.

5. The process of claim 1 wherein the aluminosilicate powder comprises slag.

* * * * *